Aug. 15, 1961 T. H. WITHERBY 2,996,716
ROTATING FEED FOR MICROWAVE CONICAL SCAN
Filed May 27, 1959
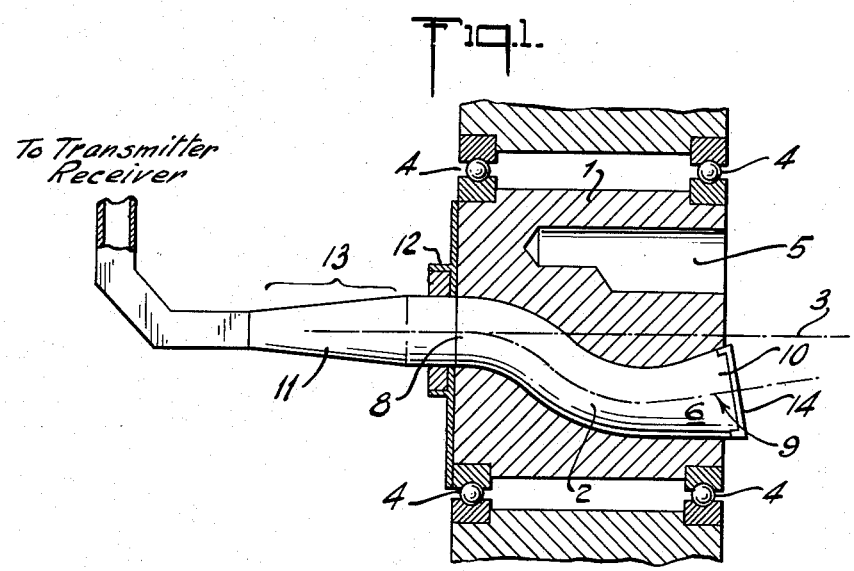
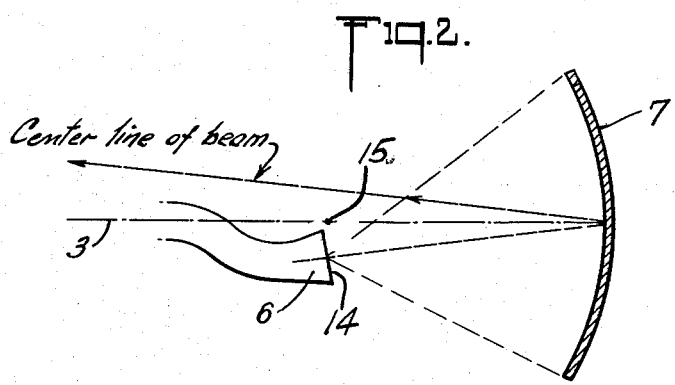
INVENTOR:
THOMAS H. WITHERBY
BY Max A. Framer
ATTORNEYS:

United States Patent Office 2,996,716
Patented Aug. 15, 1961

2,996,716
ROTATING FEED FOR MICROWAVE CONICAL SCAN
Thomas H. Witherby, Saxonville, Mass., assignor, by mesne assignments, to the United States of America as represented by the Secretary of the Navy
Filed May 27, 1959, Ser. No. 816,350
2 Claims. (Cl. 343—781)

This invention relates in general to the directional reception or transmission of high frequency electromagnetic energy, and more particularly to antenna systems employing a rotating feed to generate an eccentrically rotating beam of electromagnetic energy.

In certain types of radio target tracking systems, it is highly desirable to be able to continually determine accurately both the azimuth and elevation of a target. This form of tracking is usually accomplished by eccentrically spinning a narrow pencil beam so that it forms a conical scan of radiated energy in space. An echo will be returned at the antenna only when the beam impinges on a target. In order to accurately track the target the beam must be centered on the target. Thus, if the echo received at some reference point namely, 0° angular rotation of the conical scan is of equal strength with the echo received at the 180° scan location, the target is centered on the antenna with respect to one reference plane. If the same time, equal echoes are received from the 90° and 270° scan locations, the antenna as a whole is centered on the target. It can therefore be readily seen that in the case of fast moving targets a high scan rotation velocity is required since the target will have moved off center before the conical beam has rotated through 180° and the signal strengths will not be comparable.

A conical scan can be achieved by several combinations of feed or reflector rotations although the majority of installations involve rotation of the feed alone. The usual speed of rotation for conical scanners is about 1800 revolutions per minute, which makes it impracticable to rotate paraboloids that are over two feet in diameter. Rotating feeds require either a reflection of the energy from the feed to the main reflector or special antennas for direct front feed in order to produce the proper conical scan pattern at high rotational velocities.

One object of this invention is to provide an improved energy feed system adaptable to conical scanning.

A further object is to provide a feed having an extremely rapid conical scanning rate, thereby improving the performance and efficiency of the target tracking system.

Other objects are to provide a simple, strong, efficient and mechanically well balanced scanning antenna system.

Other objects and advantages will be apparent from the following description of an embodiment of the invention, and the novel features thereof will be particularly pointed out hereinafter in connection with the appended claims.

In the accompanying drawings wherein:
FIGURE 1 is a sectional view approximately longitudinally through the center of waveguide passage of one type of feed system which may be used in accordance with the present invention; and
FIGURE 2 shows the physical positioning of the feed system with respect to a parabolic reflector as may be used with this invention.

In the illustrated embodiment of this invention, a rotatable energy feed for conical scanning in the form of a cylindrical member 1 has a waveguide passage 2 therethrough, circular in transverse cross section and is supported at its periphery for rotation about its center axis 3 (centerline of a reflector or lens) by antifriction bearings 4. The member 1 has a recess 5 disposed at the opposite side of the central axis from the waveguide passage 2 to dynamically counter-balance the waveguide passage during rotation of the entire member 1. The feed horn 6 is directed angularly to the axis 3 toward the center of a parabolic reflector 7 in the manner shown in FIG. 2. The circular waveguide passage through the cylindrical member 1 at its inlet end 8 has its axis 9 coincident with the adjacent end of the axis 3 of the waveguide passage and which is also the axis of rotation of the member 1. The opposite end 10 of the passage 2, namely the feed, opens outwardly in a direction forming an acute angle with the axis of rotation 3. The waveguide passage 2 may pursue between its ends, any desired course in accordance with this invention, but the approximate figure S as shown in this particular embodiment is advantageous in that abrupt changes in direction are avoided and as a result lower voltage standing wave ratios are theoretically encountered and simple balancing passages such as recess 5 are practicable. In coupling the end 8 of the waveguide passage 2 to waveguide 11 their adjacent edges are in an approximately abutting relationship with their axes coinciding through a choke joint 12 thereby permitting rotation of the waveguide passage in the member 1 relative to the stationary transition waveguide 11. Any suitable device permitting rotation of the member 1, as demanded by the installation, may be susbtituted for the choke joint 12. Since in most instances of high frequency energy transmission, rectangular waveguides supporting various modes such as $TE_{11}$ are employed, the waveguide 11 forms a transition 13 from a rectangular guide to a circular guide for coupling to the circular guide 2. This transition feature is optional herein as are the particular dimensions of the waveguides, the modes to be supported therein, the dimensions of member 1, the type of feed horn employed at the outlet end 10 though a conical horn is embodied, and the means used to rotate member 1, with only the provision that these features be consistent with each other and with the invention.

Member 1 may be rotated by any number of means not shown, as for instance, a simple two pole synchronous motor or an air turbine. These devices, in addition to simplicity, offer the advantage that the position (reference) of the rotating feed may be referenced, determined and displayed during rotation. Where conditions such as varying temperature, pressure and humidity require pressurization of the waveguide portion as aboard aircraft and submarines, the air therein can be made to rotate the member 1 through an air turbine. The only requirements then to be met are a pressurizing window 14 over the feed horn and means (not shown) to maintain a constant pressure within the waveguide. This latter system is readily adaptable for supplying a position reference voltage from a stator having conventional resolver windings by incorporation of a rotor having a permanent magnet therein and rotating in synchronism with member 1.

The parabolic reflector 7, used for example in conjunction with the aforedesribed rotating feed system, has its concave reflecting surface facing the feed horn 6, serves to both focus and shape the energy received from the feed into a pencil beam directed outwardly from its concave face as illustrated in FIG. 2 by dashed lines. The feed horn 6 of the feed system rotates about an axis which is the center line 3 of the parabolic reflector and substantially around the focus 15 of the reflector. Since the feed horn is directed toward the approximate center of the parabolic reflector at an acute angle with the reflector axis, the reflected pencil scanning beam spins or moves eccentrically in space thereby forming a conical annular scan pattern with the apex approximately on the centerline of the reflector, as the feed system rotates, the antenna as a whole centers the beam on a target for determination of target location and tracking as is well understood in the art. With this device a rotary speed of rotating member 1 of about 400 revolutions per second are entirely feasible and advantageous.

It will be understood that various other changes in details and arrangement of parts which have been herein disclosed in order to explain the nature of this invention, may be made by those skilled in the art within the principle and scope of the invention as expressed in the appended claims.

I claim:

1. A high speed conical scanning antenna system employing a parabolic reflector which comprises a waveguide section having a guide passage therethrough circular in transverse cross-section, a generally cylindrical member having an S shaped passage circular in transverse cross-section therethrough which extends approximately longitudinally of said member, said passage being less than one-half the total volume of said member, said guide and said member disposed end to end and coupled through a choke joint with their passages at the abutting ends joined to form a continuous conducting passage, said member being rotatable relatively to the guide about the axis of said guide at the junction between the passages, said member having a recess disposed at the opposite side of the axis of rotation of said member from said passage for dynamic counter balancing of said member, the end of said S shaped passage opposite said choke joint being approximately conical in shape and opening outwardly of said S shaped channel in a direction at an acute angle to the axis of rotation of said member and directed substantially at the center of said reflector while said member is disposed for rotation about approximately the focus of said reflector whereby energy emanating from said S shaped passage will be reflected in an approximately annular conical pattern.

2. A high speed conical scanning antenna system employing a parabolic reflector which comprises a waveguide section having a guide passage therethrough circular in transverse cross-section, a generally cylindrical member having an S shaped passage circular in transverse cross-section therethrough which extends approximately longitudinally of said member, said guide and said member disposed end to end and coupled through a choke joint with their passages at the abutting ends joined to form a continuous conducting passage, said member being rotatable relatively to the guide about the axis of said guide at the junction between the passages, said member having a recess disposed at the opposite side of the axis of rotation of said member from said passage for dynamic counter balancing of said member, the end of said S shaped passage opposite said choke joint being approximately conical in shape and opening outwardly of said S shaped channel in a direction at an acute angle to the axis of rotation of said member and directed substantially at the center of said reflector while said member is disposed for rotation about approximately the focus of said reflector whereby energy emanating from said S shaped passage will be reflected in an approximately annular conical pattern.

References Cited in the file of this patent

UNITED STATES PATENTS

| | | |
|---|---|---|
| 2,429,601 | Biskeborn et al. | Oct. 28, 1947 |
| 2,545,472 | Kline | Mar. 20, 1951 |
| 2,575,058 | King | Nov. 13, 1951 |
| 2,616,078 | Fyler | Oct. 28, 1952 |
| 2,825,059 | Hatkin | Feb. 25, 1958 |